(12) United States Patent
Ballen et al.

(10) Patent No.: US 6,848,822 B2
(45) Date of Patent: Feb. 1, 2005

(54) LIGHT GUIDE WITHIN RECESSED HOUSING

(75) Inventors: Todd A. Ballen, St. Paul, MN (US); Michael C. Lea, Bracknell (GB); David J. Lundin, Woodbury, MN (US); Stephen M. Randall, North St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/160,400

(22) Filed: May 31, 2002

(65) Prior Publication Data

US 2003/0223250 A1 Dec. 4, 2003

(51) Int. Cl.$^7$ ............................. A45D 42/10; F21V 8/00
(52) U.S. Cl. ........................ 362/577; 362/136; 362/560
(58) Field of Search ............................... 362/135–137, 362/154–156, 26, 30, 560, 571, 577; 40/547

(56) References Cited

U.S. PATENT DOCUMENTS

| | | |
|---|---|---|
| 247,229 A | 9/1881 | Wheeler |
| 893,060 A | 7/1908 | Dobbins |
| 1,794,557 A | 3/1931 | Symonds |
| 2,140,972 A | 12/1938 | Rylsky |
| 2,186,143 A | 1/1940 | Neugass |
| 2,188,821 A | 1/1940 | Rylsky |
| 2,207,117 A | 7/1940 | Collins |
| 2,227,368 A | 12/1940 | Rylsky |
| 2,247,258 A | 6/1941 | Shepard |
| 2,259,910 A | 10/1941 | Rylsky |
| 2,316,589 A | 4/1943 | Iwanowicz |
| 2,452,294 A | 10/1948 | Dickson |
| 2,480,393 A | 8/1949 | Bossert et al. |
| 2,515,437 A | 7/1950 | Bisch et al. |
| 2,591,864 A | 4/1952 | Peter et al. |
| 2,611,018 A | 9/1952 | Thorp |
| 2,614,203 A | 10/1952 | Dalton, Jr. et al. |
| 2,689,948 A | 9/1954 | Rothman |
| 2,719,214 A | 9/1955 | Potter |
| 3,302,012 A * | 1/1967 | Keppisch .................... 362/560 |
| 3,328,570 A | 6/1967 | Balchunas |
| 3,352,277 A | 11/1967 | Schmidt |
| 3,389,247 A | 6/1968 | Null |
| 3,526,880 A | 9/1970 | Filippazzi |
| 3,535,018 A | 10/1970 | Vasilatos |
| 3,598,987 A * | 8/1971 | Kipping ..................... 362/137 |
| 3,692,383 A | 9/1972 | Herod et al. |
| 3,829,675 A | 8/1974 | Mariani |
| 3,864,905 A | 2/1975 | Richardson |
| 4,017,155 A | 4/1977 | Yagi et al. |
| 4,052,120 A | 10/1977 | Sick et al. |
| 4,068,121 A | 1/1978 | Bringhurst et al. |

(List continued on next page.)

FOREIGN PATENT DOCUMENTS

| | | |
|---|---|---|
| EP | 0 800 036 | 10/1997 |
| GB | 523706 | 3/1940 |
| GB | 2346206 | 8/2000 |
| WO | WO 88/03770 | 6/1988 |
| WO | WO 01/97681 | 12/2001 |
| WO | WO 01/97682 | 12/2001 |

Primary Examiner—Alan Cariaso
(74) Attorney, Agent, or Firm—Stephen W. Buckingham

(57) ABSTRACT

The invention is directed to an illumination apparatus that includes a light guide within a recessed housing. A light source, such as a light emitting diode can be used to provide light to the light guide. The light is transmitted through the light guide via total internal reflection (TIR), and can be emitted in a controlled manner to ensure that a desired angular distribution of light is achieved without substantially illuminating interior side walls of the recessed housing. In this manner, efficient lighting can be provided. In one embodiment, the invention is can be implemented within a cosmetic compact that includes a mirror. The compact may incorporate aspects of the invention by implementing a light guide within a ring-shaped recess of the compact to provide facial lighting to a user.

31 Claims, 8 Drawing Sheets

U.S. PATENT DOCUMENTS

| | | | |
|---|---|---|---|
| 4,141,058 A | 2/1979 | Mizohata et al. | |
| 4,173,390 A | 11/1979 | Kach | |
| 4,195,907 A | 4/1980 | Zamja et al. | |
| 4,196,962 A | 4/1980 | Sick | |
| 4,234,907 A | 11/1980 | Daniel | |
| 4,323,951 A | 4/1982 | Pasco | |
| 4,422,719 A | * 12/1983 | Orcutt | 40/547 |
| 4,447,118 A | 5/1984 | Mulkey | |
| 4,466,697 A | 8/1984 | Daniel | |
| 4,471,412 A | 9/1984 | Mori | |
| 4,549,782 A | 10/1985 | Miller | |
| 4,561,043 A | 12/1985 | Thompson | |
| 4,733,332 A | 3/1988 | Yamashita et al. | |
| 4,743,410 A | 5/1988 | Grethen et al. | |
| 4,765,701 A | 8/1988 | Cheslak | |
| 4,805,984 A | 2/1989 | Cobb, Jr. | |
| 4,822,123 A | 4/1989 | Mori | |
| 4,929,866 A | 5/1990 | Murata et al. | |
| 4,936,663 A | 6/1990 | Mori | |
| 4,936,668 A | 6/1990 | Mori | |
| 4,975,807 A | 12/1990 | Ohashi | |
| 4,984,378 A | 1/1991 | Colman | |
| 5,013,893 A | 5/1991 | Goessler et al. | |
| 5,037,172 A | 8/1991 | Hekman et al. | |
| 5,128,842 A | 7/1992 | Kenmochi | |
| 5,432,876 A | 7/1995 | Appeldorn et al. | |
| 5,590,945 A | 1/1997 | Simms | |
| 5,786,665 A | 7/1998 | Ohtsuki et al. | |
| 5,791,757 A | 8/1998 | O'Neil et al. | |
| 5,845,038 A | 12/1998 | Lundin et al. | |
| 5,898,810 A | 4/1999 | Devens, Jr. et al. | |
| 5,969,343 A | 10/1999 | Nakamura et al. | |
| 5,984,485 A | * 11/1999 | Poli et al. | 362/30 |
| 6,033,604 A | 3/2000 | Lundin et al. | |
| 6,193,383 B1 | 2/2001 | Onikiri et al. | |
| 6,232,592 B1 | 5/2001 | Sugiyama | |
| 6,234,656 B1 | 5/2001 | Hosseini et al. | |
| 6,259,855 B1 | 7/2001 | Lundin | |
| 6,267,492 B1 | 7/2001 | Reid et al. | |
| 6,268,600 B1 | 7/2001 | Nakamura et al. | |
| 6,280,044 B1 | 8/2001 | Kusakabe | |
| 6,283,602 B1 | 9/2001 | Kawaguchi et al. | |
| 6,286,970 B1 | 9/2001 | Egawa et al. | |
| 6,293,683 B1 | 9/2001 | Okada | |
| 6,295,104 B1 | 9/2001 | Egawa et al. | |
| 6,301,418 B1 | 10/2001 | Freier et al. | |
| 2001/0017773 A1 | 8/2001 | Suzuki et al. | |
| 2001/0020984 A1 | 9/2001 | Umemoto | |

* cited by examiner

LIGHT GUIDE WITHIN RECESSED HOUSING

FIELD

The invention relates to light guides for functional or decorative lighting.

BACKGROUND

Light guides can be used to provide functional or decorative lighting. Functional lighting refers to lighting that is used for the purpose of illuminating an object or area to make the object or area more conspicuous. Decorative lighting refers to lighting that is used for aesthetic purposes. Often, light guides are used for both functional and decorative purposes.

A light source can be used to illuminate one or more light guides such that light is transmitted through the light guides via total internal reflection (TIR). Light guides may provide side lighting, in which light is emitted from the sides of the guides. In addition, light guides may provide end lighting, in which light is emitted from the end of the guides. A variety of different light extraction techniques using notches or coatings, for example, can be applied to the light guides to cause light to be emitted from the sides of the light guides in a controlled or random manner.

Lighting systems that implement light guides generally have one or more light sources that illuminate the light guide. For example, incandescent light sources, or solid state light sources such as light emitting diodes are often used to illuminate light guides. The light source may reside in a light source assembly, also referred to as an illuminator. The light can be transmitted down the light guide, and may change colors or pulsate over time to provide the desired functional or decorative effect.

SUMMARY

In general, the invention is directed to an illumination apparatus that includes a light guide within a recessed housing. A light source, such as a light emitting diode can be used to provide light to the light guide. The light is transmitted through the light guide via total internal reflection (TIR), and can be extracted in a controlled manner to ensure that a desired angular distribution of light is achieved without substantially illuminating interior side walls of the recessed housing. In this manner, emission of light outward from the illumination apparatus can be enhanced, providing efficient lighting from a more compact structure.

In one embodiment, the invention is directed to an illumination apparatus comprising a housing formed with a recess, wherein the recess includes one or more interior walls. The illumination apparatus also includes a light guide positioned substantially within the recess such that the light guide is in proximity to the interior walls. The light guide can be formed with one or more light extraction features, such as notches, that define an angular distribution of light emitted from the light guide. The light extraction features can be defined such that the angular distribution of light emitted from the light guide causes light to be angularly dispersed from the recess without substantially illuminating the interior side walls of the recess.

Various embodiments of the invention may find use in a number of applications, including lighting fixtures and the like. One specific embodiment, outlined in greater detail below, relates to a cosmetic compact that includes a mirror. The compact may incorporate aspects of the invention by implementing a light guide within a ring-shaped recess of the compact to provide facial lighting to a user of the compact. The compact can maintain a relatively small form-factor because the light guide is positioned within the recessed housing.

Additional details of these and other embodiments are set forth in the accompanying drawings and the description below. Other features, objects and advantages will become apparent from the description and drawings, and from the claims.

DETAILED DESCRIPTION

Figure 1:
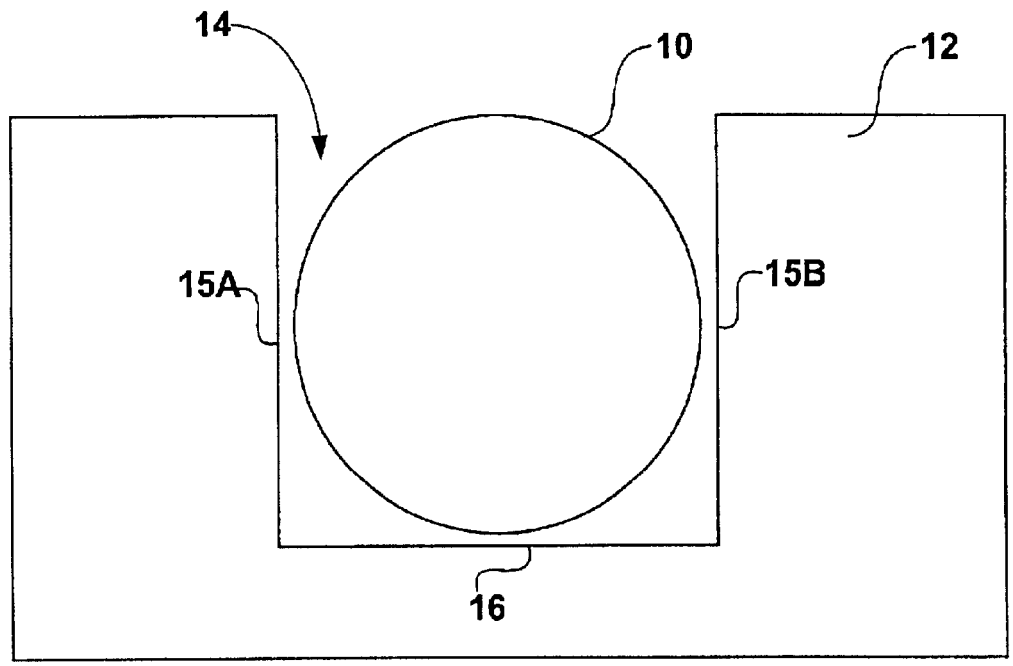
FIG. 1 is a cross-sectional view of a light guide housed within a recessed housing.

FIG. 1 is a cross-sectional view of a light guide 10 housed within a recessed housing 12. In particular, recessed housing 12 is formed with recess 14 which includes one or more interior walls 15, 16. For example, recess 14 may include interior side walls 15A, 15B and interior back wall 16. Light guide 10 is positioned substantially within recess 14 such that light guide 10 is in proximity to the interior walls. As described in greater detail below, light guide 10 is formed with one or more light extraction features that define an angular distribution of light emitted laterally from light guide 10. The light extraction features may comprise coatings, notches, or any other suitable light extraction features. The light extraction features can define the angular distribution of light emitted from the light guide such that light is angularly dispersed from recess 14 without substantially illuminating one or more of the interior side walls 15. In other words, the light extraction features may serve to direct light outward from recess 14 such that substantial illumination of side walls 15A and 15B can be minimized or avoided. In this manner, more efficient lighting can be achieved. Moreover, the need to provide mirrored or reflective surfaces on one or more interior walls 15, 16 to achieve the efficient lighting can be avoided.

Recess 14 of housing 12 can provide a useful structure for defining the positioning of light guide 10. As described below, recess 14 may define a path which forms various 2-dimensional or 3-dimensional shapes such as for example, characters, numbers, geometric shapes, or other aesthetically desirable shapes or configurations. In this manner recess 14 of housing can provide a useful tool for positioning or suspending light guide 10. For example, one embodiment described in greater detail below implements a light guide within a ring-shaped recess of a cosmetic compact. In any case, one or more interior walls 15, 16 may be roughened to reduce or avoid optical coupling between light guide 10 and housing 12.

Figure 2:
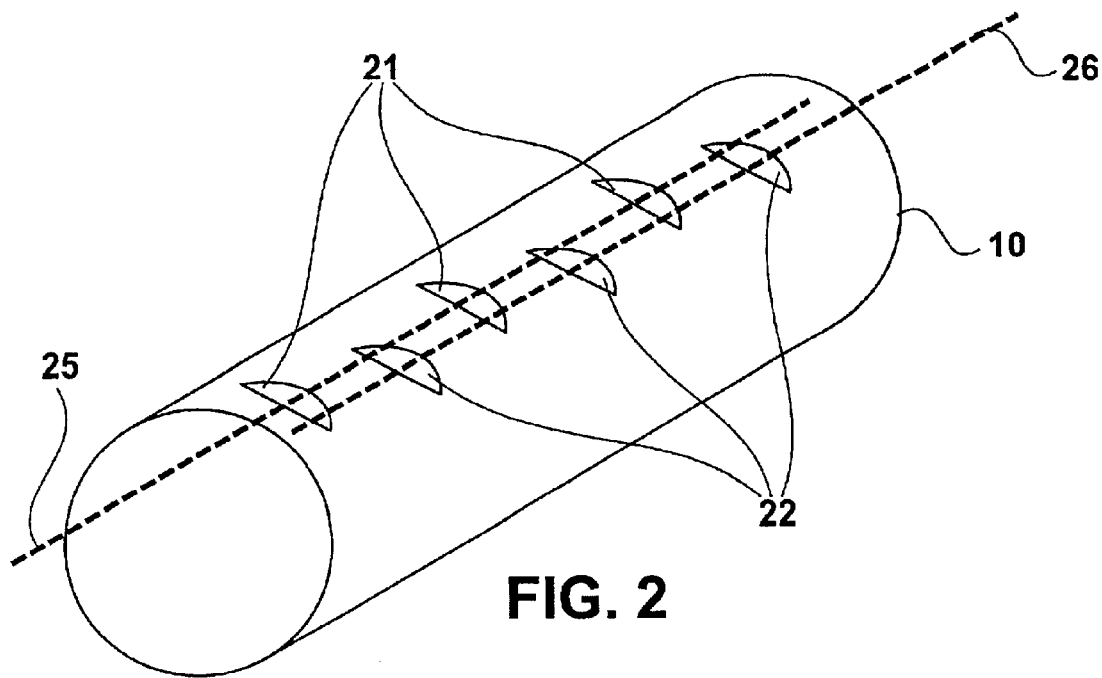
FIG. 2 is a perspective view of a suitable light guide that may be used in accordance with one or more embodiments of the invention.

FIG. 2 is a perspective view of a suitable light guide 10 that may be used in accordance with one or more embodiments of the invention. Specifically, light guide 10 is formed with sets of notches 21 and 22, which cause light to be emitted from light guide 10 according to an angular distribution that can achieve effective and efficient light distribution from the recessed housing.

For example, light guide 10 may comprise a light guide substantially as described in U.S. Pat. No. 5,845,038. Such light guides are commercially available from Minnesota Mining and Manufacturing Company ("3M") of St. Paul, Minn. Light guide 10 may include a first set of notches 21 formed on light guide 10 along a first centerline axis 25, as well as a second set of notches 22 formed on light guide 10 along a second centerline axis 26. In other words, first notches 21 are substantially centered on centerline axis 25, whereas second notches 22 are substantially centered on axis 26. The first and second centerline axes 25, 26 can be defined relative to one another to ensure that the angular distribution of light emitted from light guide 10 is relatively large, but does not inefficiently illuminate interior side walls 15 of recess 14 (FIG. 1). In some cases, the angular distribution of light emitted from light guide 10 can be substantially maximized without illuminating the interior side walls 15 of recess 14. Light intensity may also be substantially maximized without illuminating the interior side walls 15 of recess 14. Other variables, such as the ratios of the depths of the notches to the diameter of the light guide may also be chosen to ensure that the desired angular distribution and light intensity is achieved.

Figure 3:
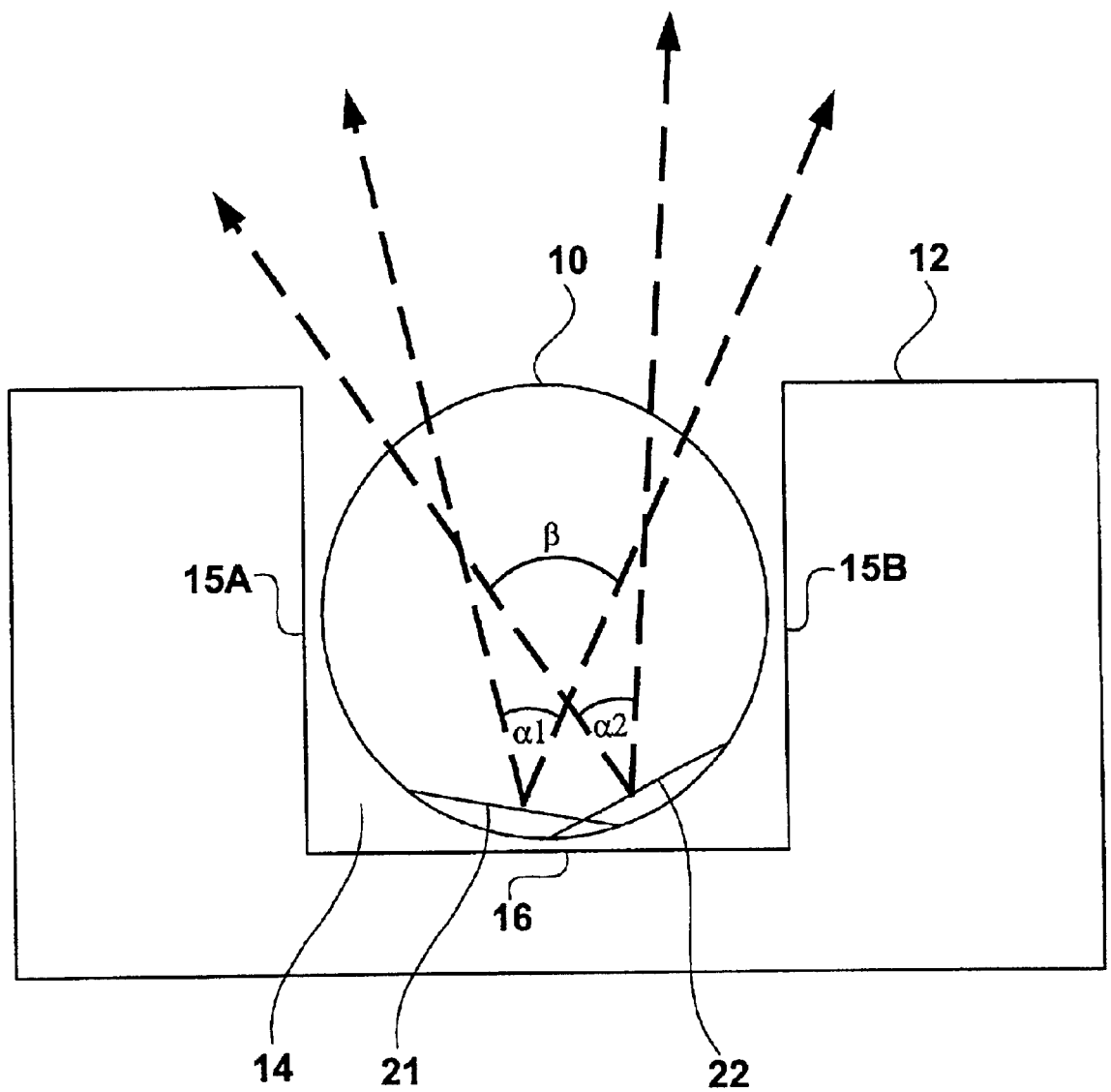
FIG. 3 is a more detailed cross-sectional view of a light guide housed within a recessed housing.

FIG. 3 is a more detailed cross-sectional view of light guide 10 housed within recessed housing 12. As shown, first notches 21 define a light extraction angle $\alpha 1$. In addition, second notches 22 define light extraction angle $\alpha 2$. Angles $\alpha 1$ and $\alpha 2$ may depend on one or more factors including the ratios of the depths of the notches to the diameter of light guide 10, the angle at which light is introduced into light guide, and possibly other factors. Any number of sets of notches can be implemented. In any case, the light extraction angles associated with the sets of notches overlap with one another to define angle $\beta$. Angle $\beta$ may be dependent on the angular size of each of light extraction angles $\alpha 1$ and $\alpha 2$, as well as the angular distance (offset) between centerline axes of the notches that respectively define light extraction angles $\alpha 1$ and $\alpha 2$.

In accordance with the invention, angle $\beta$ can be defined such that emitted light is angularly dispersed for effective and efficient lighting, specifically when light guide 10 is housed within recess 14. In other words, angle $\beta$ is defined such that interior side walls 15 of recess 14 are not substantially illuminated, avoiding inefficient loss of light. Illumination of interior side walls 15 can result in inefficient use of the available light transmitted through light guide 10 via total internal reflection (TIR). In addition, illumination of interior side walls 15 can result in lighting artifacts and/or shadowing that is often undesirable. By avoiding illumination of side walls 15, greater lighting efficiency can be achieved and the need for mirrored or reflective surfaces within recess 14 can also be avoided. For these reasons, angle $\beta$ is defined such that illumination of interior side walls 15 is substantially avoided. In one specific example, $\beta$ can defined such that emitted light is angularly dispersed so that a very high level of light extraction efficiency can be achieved from light guide 10 housed within housing 12. For example, high efficiency optically smooth notches may be used to extract a large amount of light from light guide 10. In some cases, high efficiency optically smooth notches can be used to extract greater than 70 percent of the light introduced into light guide 10 by an LED in a direction defined by $\beta$, i.e., away from recess 14. Optically smooth notches generally refer to notches that have smooth surfaces capable of reflecting light incident on the surface with minimal scattering or diffusion. In other words, the surface roughness may be small in comparison to the wavelength of light being transmitted through light guide 10 via total internal reflection (TIR). In that case, only a small amount of stray light may escape through the notches themselves, e.g., in a direction that illuminates back wall 16. For example less than 10 percent or even less than 5 percent of light introduced into light guide 10 may illuminate back wall 16. Approximately 20 percent of the light introduced into light guide 10 may propagate down the length of light guide 10 without being extracted. In this example, less than 5 percent, less than 1 percent, or even less than 0.25 percent of the light introduced into light guide 10 may illuminate side walls 15. In this manner, efficient use of the available light can be achieved, and at the same time shadowing or lighting artifacts associated with the illumination of side walls 15 can be avoided.

Figure 4:
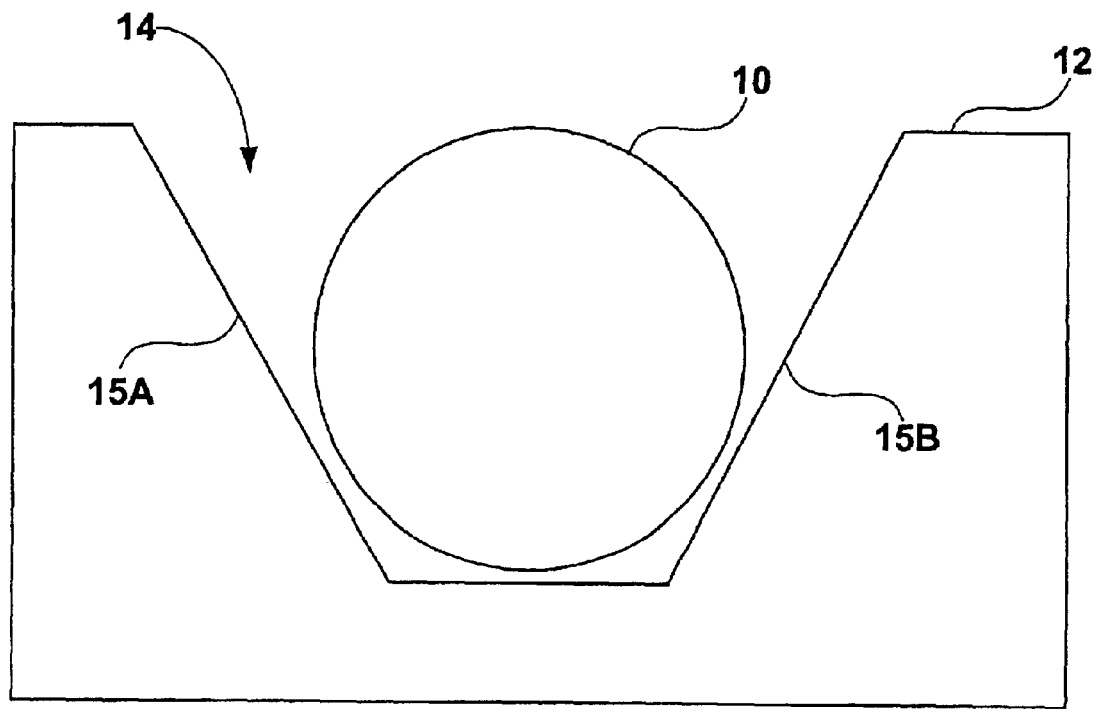
FIGS. 4 and 5 are additional cross-sectional side views of a light guide housed within a recessed housing.
Figure 5:
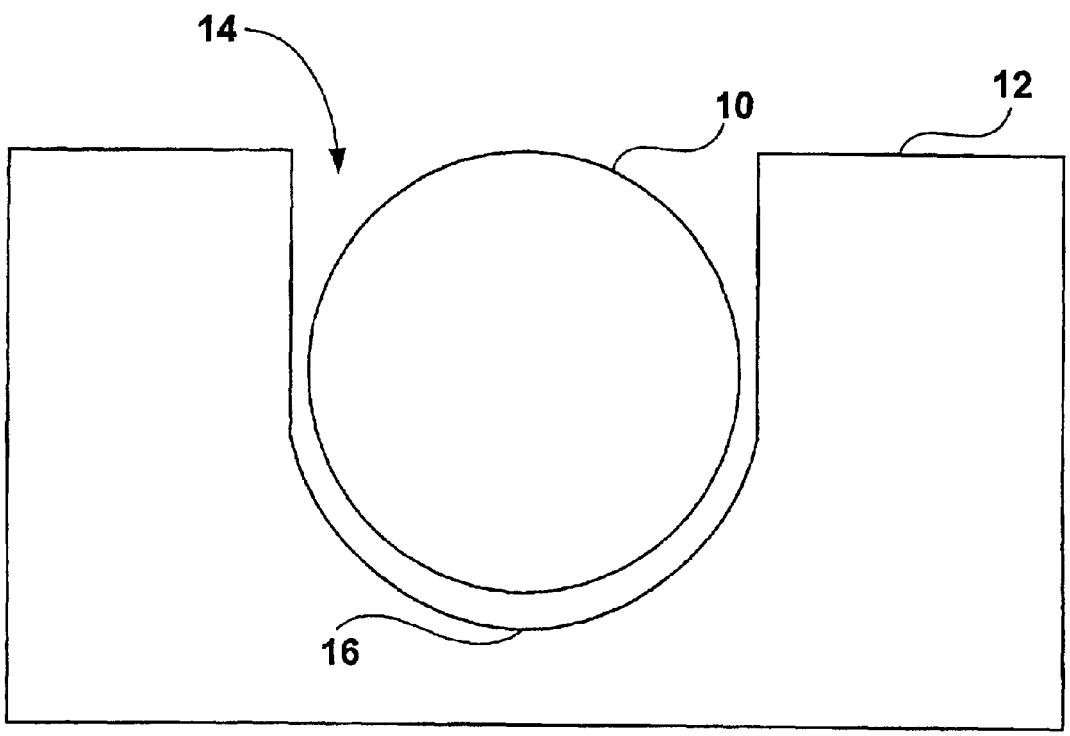

FIGS. 4 and 5 are additional cross-sectional side views of a light guide 10 housed within a recessed housing 12. As shown, the interior walls of the recessed housing 12 may take a number of different shapes. For example, as shown in FIG. 4, side walls 15A and 15B may be angled to facilitate even larger extraction angles from light guide 10, without substantially illuminating the side walls. Also, as shown, in FIG. 5, end wall 15C may be contoured to substantially conform to the shape of light guide 10. The cross-sectional shape of light guide 10 may take any number of different shapes, including a circular shape, as illustrated. Depending on the cross-sectional shape of light guide 10, different shapes of the interior walls may be desirable. In addition, although light guide 10 is illustrated in FIGS. 1, 4 and 5 as being positioned completely within recess 14 of recessed housing 12, in other configurations, light guide 10 may be only partially positioned within recess 14 of recessed housing 12.

Figure 6:
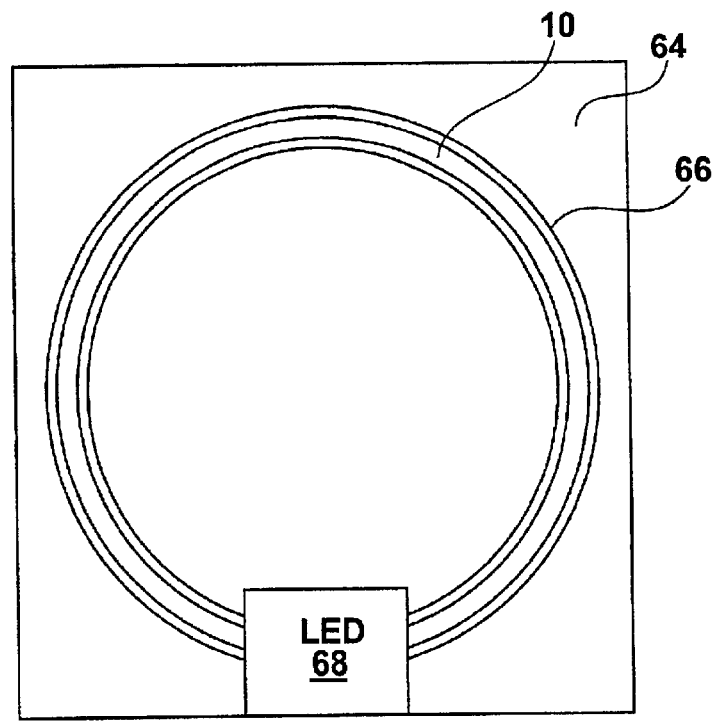
FIG. 6 is a top view of a light guide housed within a ring-shaped recessed housing.

The shape of the recess itself may also be defined as desired. In other words, the top view of the recess may define any shape. For example, FIG. 6 is a top view of light guide 10 housed within a recessed housing 64 that is formed with a ring-shaped recess 66. Other shaped recesses, however, could also be implemented, including triangular-like shapes, square-like shapes, pentagon-like shapes, hexagon-like shapes, and so forth. Variations of the ring-shape can also be implemented, for example, as circular-shapes, oval-shapes, elliptical-shapes, and so forth. In addition, the shape of the recess may define letters, symbols, characters, or the like. Moreover, in some cases the recess may be defined along a contoured or 3-dimensional shape. For example, the recess may be a spiraled recess formed around a pole. In general, the shape of the recess may take any form, including forms defined in 2-dimensions or 3-dimensions. Light guide 10 can be embedded into the contour of the recess in order to position light guide 10 according to a desired shape.

In various embodiments, the recessed housing can provide a useful structure to suspend the light guide, or otherwise define the mechanical positioning of the light guide. In this manner, the recessed housing can provide the ability to define a variety of atheistically pleasing shapes for the light guide, including letters, symbols, characters, geometric shapes, 3-dimensional shapes, and the like. Automotive (vehicle) lighting may also utilize various aspects of the invention, for example, to provide lighting for visual mirrors, signal lights, brake lights, instrument panels, or the like.

Referring again to FIG. 6, one or more solid state light sources, such as light emitting diodes (LED) 68 can be used to provide light to light guide 10. For example, light emitting diodes, may be disposed on both ends of light guide 10, or alternatively a single LED may be disposed to provide light into a first end of light guide 10. In the latter case, the second end of light guide 10 may have a reflective surface to redirect light back through light guide 10. Other light sources could also be used. If more than one LED is used, ring-shaped recess 66 may provide room for a wire which connects the LEDs.

Various embodiments of the invention may be useful in a variety of different applications. For example, a light guide housed within a recessed housing as described herein may be used to realize various different types of lighting fixtures. Also, a light guide housed within a recessed housing may be used within a variety of different device structures and gadgets. Indeed, the recessed configuration may be a useful feature for smaller sized structures that require lighting, because the recessed configuration can save space.

Figure 7:
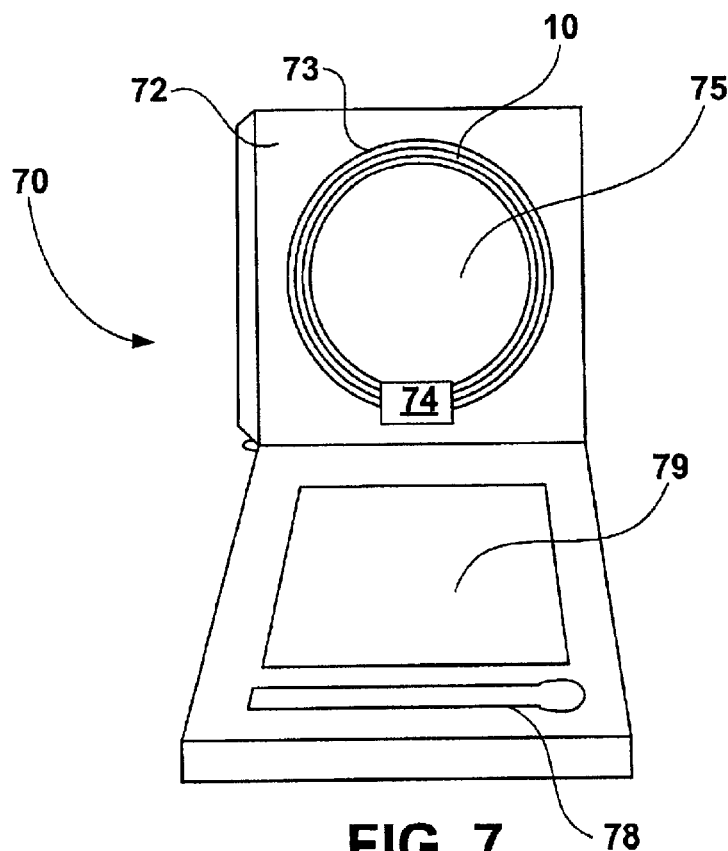
FIG. 7 is a front perspective view of a compact according to an embodiment of the invention.

FIG. 7 is a front perspective view illustrating one specific application of light guide within a recessed housing. In particular, FIG. 7 illustrates a cosmetic compact 70. Compact 70 includes a light guide 10 housed within housing 72 that is formed with a ring-shaped recess 73. One or more LEDs 74 illuminate light guide 10. A mirrored surface is disposed in an interior region 75 defined by the ring-shaped recess 73. Compact 70 may also include one or more accessories 78, and possibly a make-up region 79 for storing facial make-up, powder, or the like.

Figure 8:
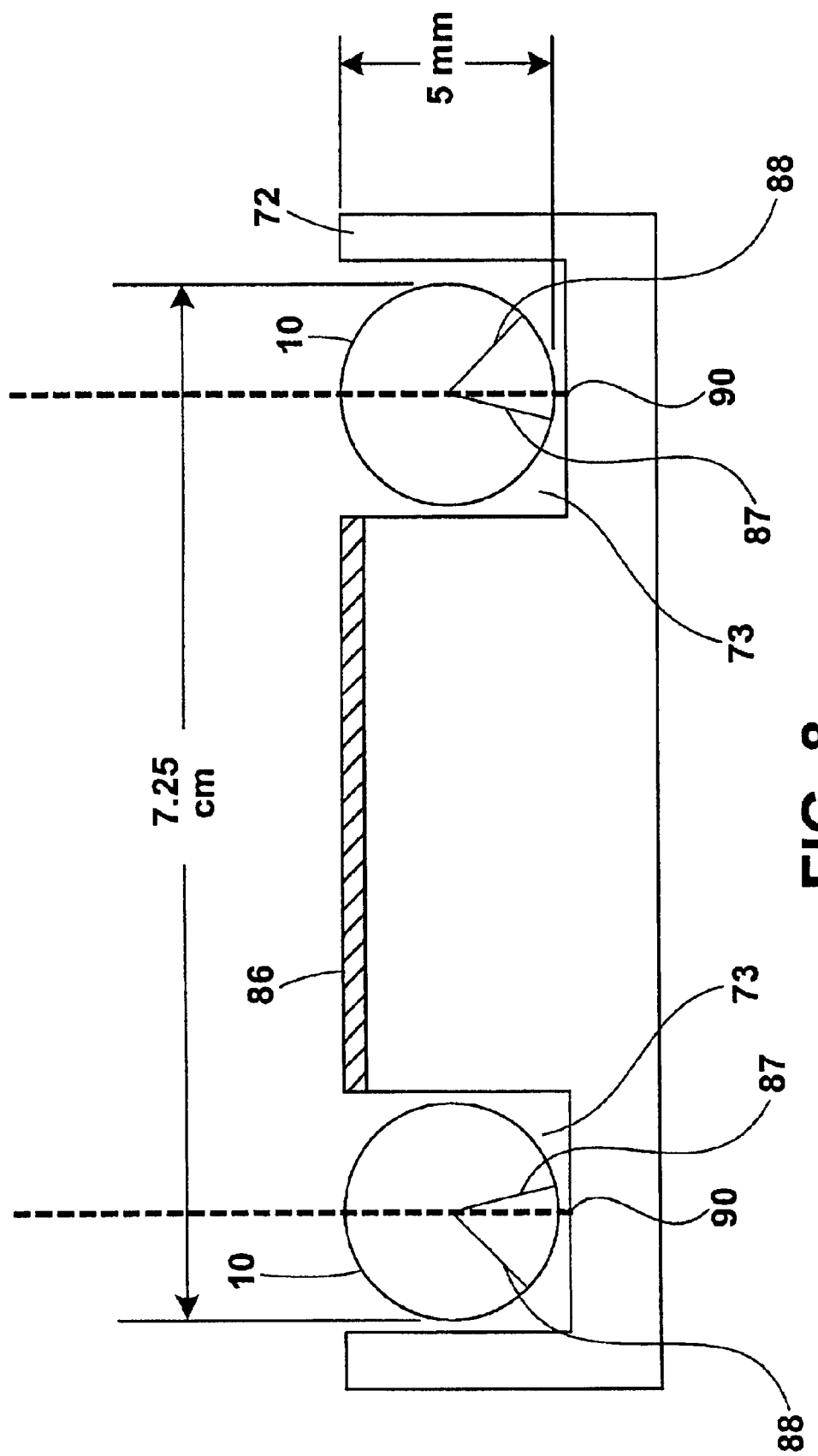
FIG. 8 is a cross-sectional side view of a portion of a compact according to an embodiment of the invention.

FIG. 8 is a cross-sectional side view of a portion of a compact according to an embodiment of the invention. Specifically, FIG. 8 corresponds to a cross-sectional side view of light guide 10 within the ring-shaped recess 73 of housing 72. As shown, an approximately 5 millimeter diameter light guide is disposed within the recess 73 of housing 72, although light guides having various different diameters could be used. Recess 73 forms a ring-shape as illustrated in FIG. 7, and a diameter of the ring-shaped recess may be approximately 7.25 centimeters. More generally, the diameter may be approximately between 2 and 50 centimeters, or approximately between 5 and 10 centimeters for useful application in a compact or similar lighted structure. A mirrored surface 86 can be provided in an interior region defined by ring-shaped recess 73. The recessed configuration can reduce the overall thickness of compact 70, which is desirable.

Sets of notches, or other suitable light extraction features may be formed or provided on light guide 10 in order to achieve a desired angular distribution of light emitted from light guide 10. The desired angular distribution may be defined according to a desired illumination plane located a distance above mirrored surface 86, for example, to improve lighting of the face of a user. In addition, the desired angular distribution may ensure that one or more interior side walls of recess 73 are not substantially illuminated. By avoiding illumination of the walls of recess 73, inefficient use of light may be reduced, and various unwanted lighting artifacts and shadowing can also be avoided. In some cases, one or more notches may have different orientations, such as orientations that are not perpendicular to a longitudinal axis of light guide 10.

In one specific example, a first set of notches 87 are located along a centerline approximately 5 degrees from points of the light guide in closest proximity to a bottom surface 90 of recess 73 in a direction toward a center of housing 72. In addition, a second set of notches 88 are located along a centerline approximately 30 degrees from points of the light guide in closest proximity to a bottom surface 90 of recess 73 in a direction away from the center of housing 72. Although, the positioning of the notches may be adjusted for other embodiments, the angles listed above have proven effective for a cosmetic compact. For example, greater than approximately 50 percent light illumination efficiency for a compact can be achieved at a specifically defined illumination plane when the sets of notches are disposed at such angles, as further outlined below. Additional sets of notches may also be used.

Figure 9:
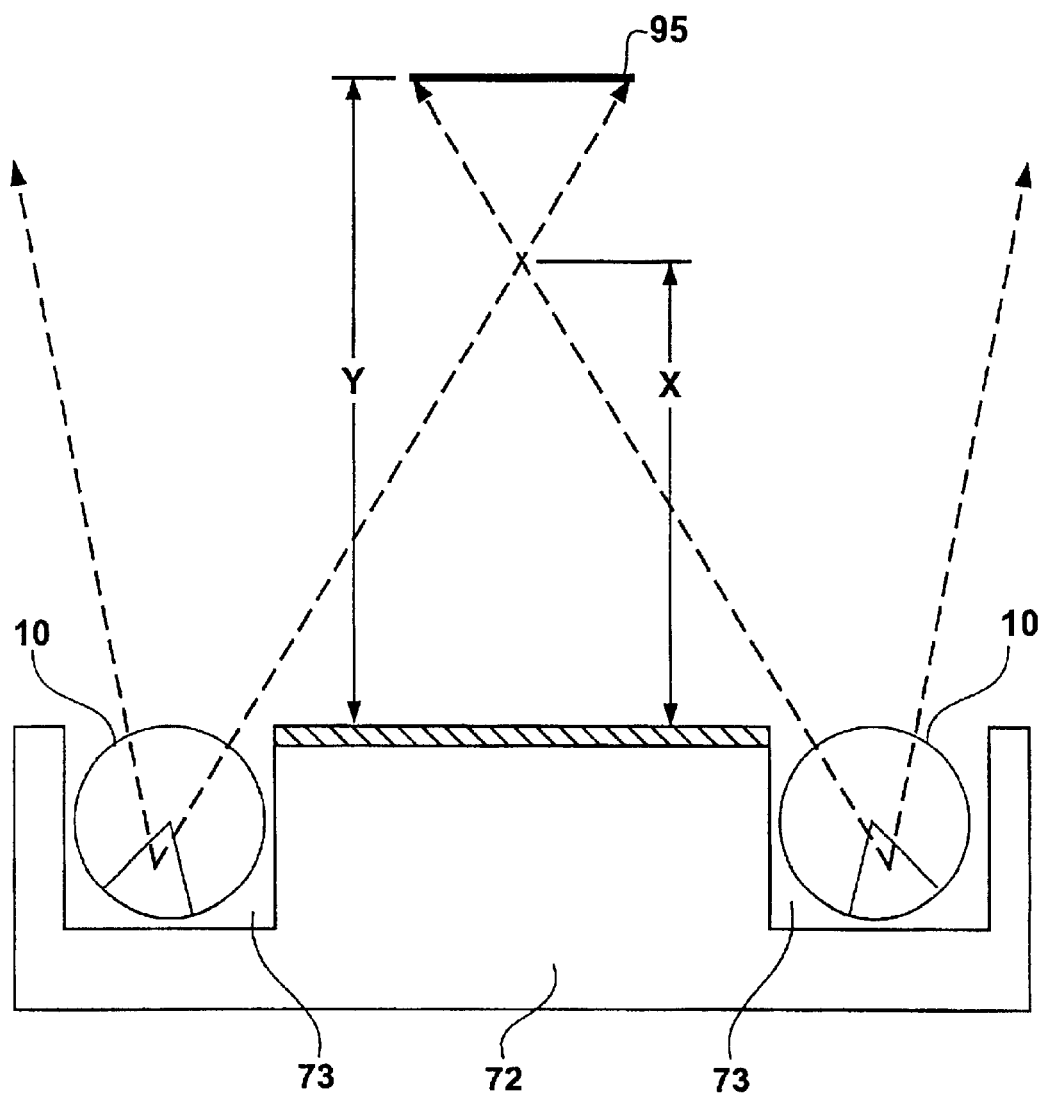
FIG. 9 is another cross-sectional side view of a portion of a compact according to an embodiment of the invention.

FIG. 9 is another cross-sectional side view of the portion of a compact illustrated in FIG. 8. As shown in FIG. 9, the emitted light (indicated by the dotted lines) exiting light guide 10 has an angular distribution that ensures that one or more interior side walls of recess 73 are not substantially illuminated. In addition, the angular distribution of emitted light is defined in a manner that establishes an illumination target 95 within an illumination plane. In other words, the angular distribution of emitted light can cause light to overlap at a distance X, typically between 2 and 50 centimeters from housing 72. In that case, the illumination plane that defines the location of target 95 may be defined at a distance Y, typically between 5 and 50 centimeters from housing 72. The angular distribution of emitted light can be chosen such that the size of target 95 is large enough to ensure that adequate illumination of the face of a user is achieved. Moreover, the positioning of the notches can be such that greater than approximately 50 percent of the light transmitted through light guide 10 illuminates the illumination target 95.

Figure 10:
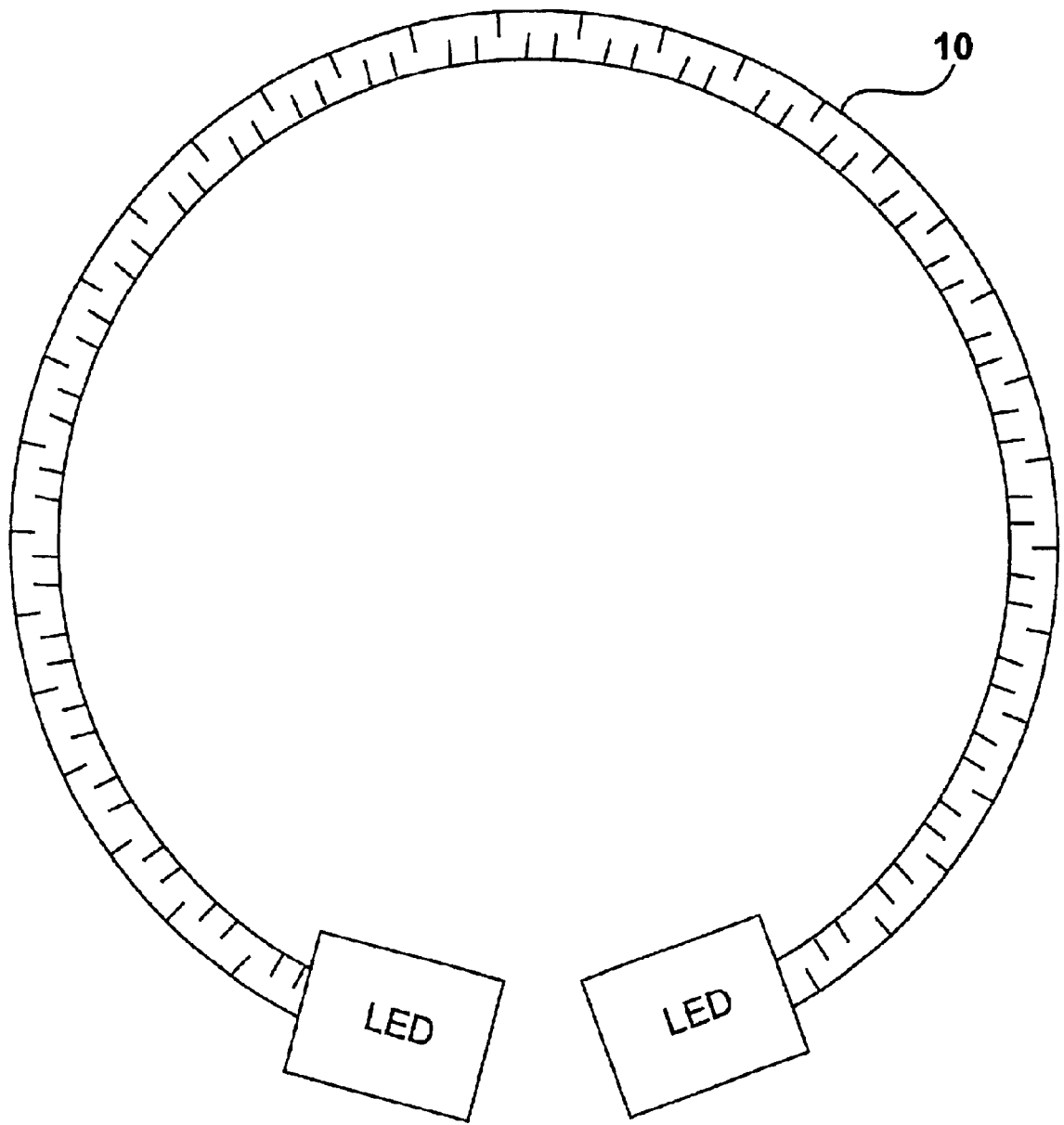
FIG. 10 is a top view of a ring-shaped notched light guide that can be used according to one or more embodiments of the invention.

FIG. 10 is a top view of a ring-shaped notched light guide that can be used according to one or more embodiments of the invention. As shown, light guide 10 is illuminated by LEDs positioned on each end of light guide 10. Illuminating both ends of light guide 10 may enhance uniformity of the light intensity of emitted light over the length of light guide 10. The notches may be approximately 0.3 millimeter deep and may have included notch angles of approximately 80 degrees, although the invention is not necessarily limited in that respect. In some cases, variables such as notch angles notch depths, spacing between notches, spacing between rows of notches, or the number of rows of notches can be chosen to achieve a desired lighting goal. Also, one or more of these variables can be varied or adjusted over the length of light guide 10 to effectuate more uniform intensity of emitted light. The notches may be separated from one another by approximately 1.5 millimeters, although the invention is not necessarily limited in that respect.

Figure 11:
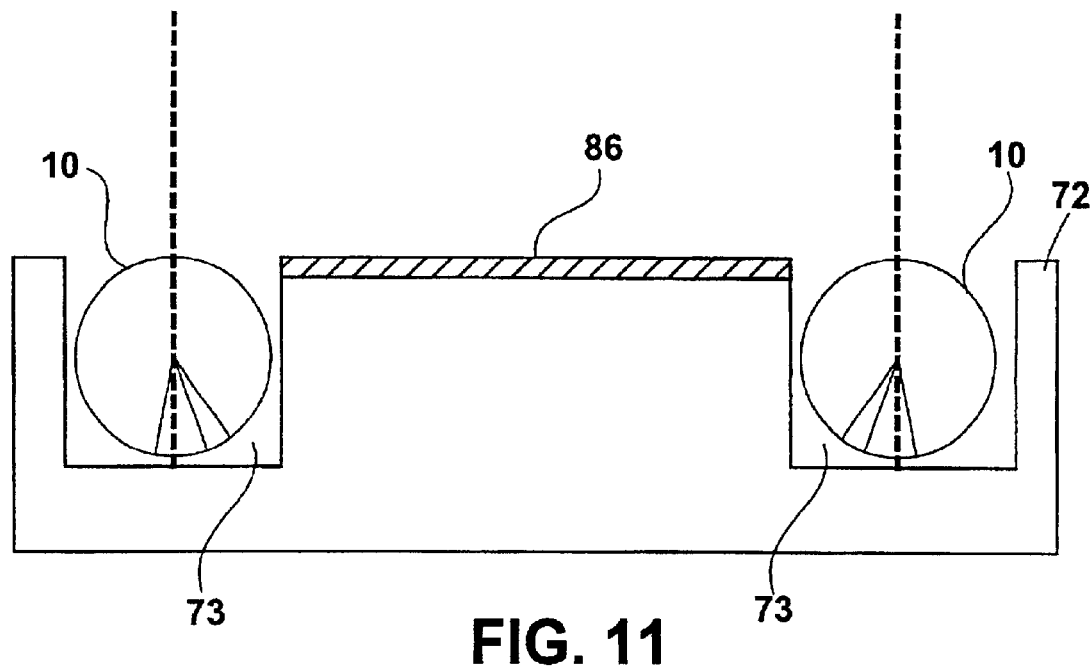
FIG. 11 is another cross-sectional side view of a light guide housed within a recessed housing according to an embodiment of the invention.

The first set of notches (in this case illustrated as being a row of notches adjacent the inner diameter of light guide 10)

can be disposed approximately 5 degrees from points of light guide 10 that will be positioned in closest proximity to a bottom surface of the recessed housing in a direction toward a center of the housing. The second set of notches (in this case illustrated as being the row of notches adjacent the inner diameter of light guide 10) can be disposed approximately 30 degrees from points of light guide 10 that will be positioned in closest proximity to a bottom surface of the recessed housing in a direction away from a center of the housing. As illustrated, the sets of notches can be arranged such that two notches in the first set separate each notch in the second set. Other configurations can also be implemented. However, the described configuration has proven effective for a compact. For example, light extraction using the described configuration can yield illumination of an illumination target to an efficiency greater than approximately 50 percent. In other words, referring again to FIG. 9, target 95 can be illuminated by greater than 50 percent of the light introduced into light guide 10. FIG. 11 is another cross-sectional side view of a light guide 10 housed within a recessed housing 72 according to an embodiment of the invention. In this example, three different sets of notches are formed on light guide 10. More specifically, different sets of notches are disposed in the following manner. The first set of notches are disposed approximately 11 degrees from points of light guide 10 that are positioned in closest proximity to a bottom surface of the recessed housing in a direction toward a center of the housing. The second set of notches are disposed approximately 5 degrees from points of light guide 10 that are positioned in closest proximity to a bottom surface of the recessed housing in a direction toward a center of the housing. The third set of notches are disposed approximately 1 degree from points of light guide 10 that are positioned in closest proximity to a bottom surface of the recessed housing in a direction away from a center of the housing. Recessed housing 72 is formed with a mirrored surface 86 on the region inside the ring-shaped recess 73 of recessed housing 72.

Other configurations of differing sets of notches can also be implemented. The positioning, separation, and arrangements of the sets of notches can be defined in a manner that ensures that efficient and effective lighting is achieved when the light guide is housed in a recess. Other variables that can be adjusted may include the diameter of the light guide, the length of the light guide, the shape and size of the recess, the notch depths, the number of notches, the type of light source used, the number of light sources used, and possibly other variables.

In addition, aspects of the invention may be implemented to realize other types of ring-lighting structures that incorporate a ring-shaped light guide within a ring-shaped recess. For example, ring-shaped lighting may be effective for devices such as inspection equipment, image acquisition equipment, photography equipment, lighted magnifiers, night lights, watches, badges, signs and the like.

Figure 12:
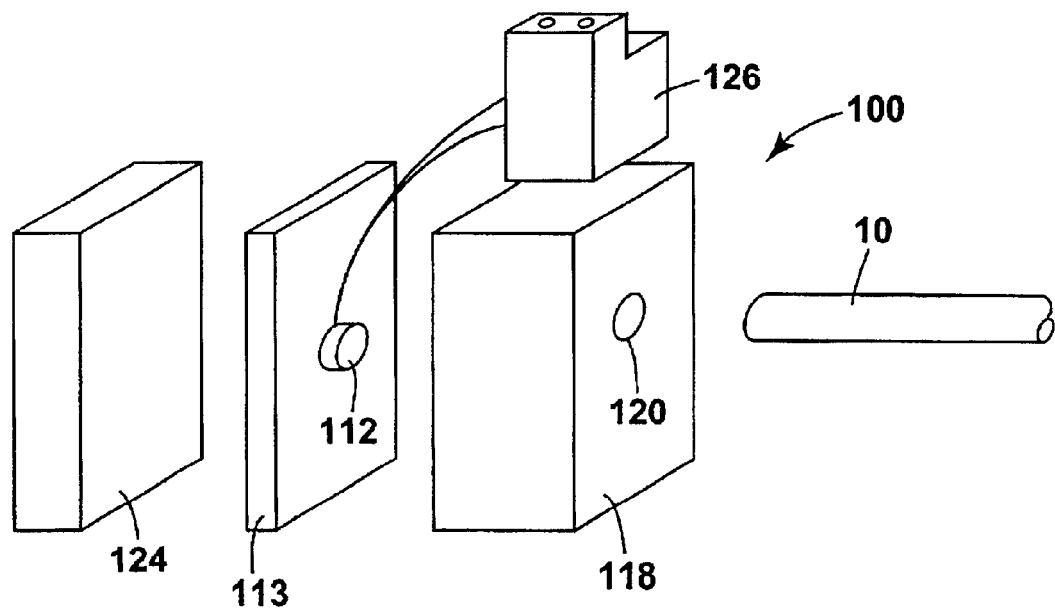
FIG. 12 is a perspective exploded view of an assembly that can be used according to one or more embodiments of the invention.

FIG. 12 is a perspective exploded view of an assembly that can be used according to one or more embodiments of the invention. Although FIG. 12 is not necessarily drawn to scale, a similar arrangement can be used to illuminate light guide 10. As shown, the apparatus 100 of FIG. 12 includes a light emitting diode 112 and a light guide 10. Apparatus 100 may also include a light guide fixture 118 formed with a hole 120 for mating with light guide 110. For example, light guide fixture 118 can be used to properly position light guide 10 relative to light emitting diode 112. Apparatus 100 may also include heat sink 124 to dissipate heat away from light emitting diode 112, and a connector 126 coupled to light emitting diode 112. For example, connector 126 may be used to connect light emitting diode 112 to a power supply (not shown). Light emitting diode 112 may reside on plate 113, although the invention is not limited in that respect. Apparatus 100, or a similar structure, may be housed within a device, with light guide 10 residing within a recessed housing as outlined above. Fixture 118, plate 113, heat sink 124, and connector 126 may be sized much smaller than illustrated in FIG. 12 to realize a illumination apparatus with a smaller form-factor.

Suitable light emitting diodes include, for example, the Luxeon™ Star/C commercially available from LumiLeds of San Jose, Calif.; the Nichia NSPW 500 BS LED, commercially available from Nichia Corporation of Japan; a three color LED such as model NSCM310, available from Nichia Corporation of Japan; or a white LED such as model NSCW100, also available from Nichia Corporation of Japan. For the cosmetic compact embodiments, the Nichia NSPW 500 BS LED proved particularly effective.

The use of light emitting diodes or other solid state light sources, according to the invention provides advantages over other light sources. In particular, light emitting diodes may be generally better suited for illumination of light guides than other non-point like light sources. In addition, the use of light emitting diodes as opposed to non-solid state light sources can reduce power consumption. Moreover, light emitting diodes can be more reliable than other light source alternatives, and may have longer lifespans that other light source alternatives. The light emitting diodes may be organic light emitting diodes (OLEDs) or inorganic light emitting diodes.

Many implementations and embodiments of the invention have been described. For instance, an illumination apparatus has been described, that effectively and efficiently implements a light guide within a recessed housing. Nevertheless, it is understood that various modifications can be made without departing from the spirit and scope of the invention. For example, the invention may be used in any application where lighting is desirable from a recessed housing, including such applications as functional or decorative lighting for buildings, water fountains, instrument panels of vehicles, aircrafts or watercrafts, aisle lighting for theaters or the like, neon-like light guide signs, turn-signals or brake lights on vehicles, automated inspection or image acquisition equipment, photography equipment, lighted magnifiers, night lights, watches, badges, under water applications, or any other application where lighting is desirable. Accordingly, other implementations and embodiments are within the scope of the following claims.

What is claimed is:

1. An illumination apparatus comprising:
    a housing formed with a recess, wherein the recess defines a ring-like shape and includes one or more interior side walls;
    a mirror surface on the housing, wherein the mirror surface is substantially surrounded by the ring-like shaped recess;
    a light guide that transmits light via total internal reflection (TIR) positioned within the recess such that the light guide is in proximity to the one or more interior side walls; and
    a set of notches formed on the light guide along a centerline axis of the tight guide to define an angular distribution of light emitted from the light guide, wherein the angular distribution of the light defined by the set of notches and emitted from the light guide is such that the light is angularly dispersed from the recess without substantially illuminating the interior side walls.

2. The illumination apparatus of claim 1, wherein the set of notches comprise a first set of notches formed on the light guide along a first centerline axis of the light guide, the apparatus further comprising a second set of notches formed on the light guide along a second centerline axis of the light guide wherein the angular distribution of the light is defined by the first and second sets of notches.

3. The illumination apparatus of claim 2, wherein the first and second sets of notches are arranged such that two notches in the first set separate each notch in the second set.

4. The illumination apparatus of claim 1, further comprising one or more light sources positioned to input light into the tight guide for light transmission via total internal reflection (TIR).

5. The illumination apparatus of claim 4, wherein the one or more light sources include one or more light emitting diodes.

6. The illumination apparatus of claim 1, wherein the illumination apparatus forms a light fixture.

7. The illumination apparatus of claim 1, wherein the apparatus comprises a compact.

8. The illumination apparatus of claim 1, wherein the angular distribution of light emitted from the light guide is directed out of the recess toward an illumination plane parallel to the ring-like shaped recess at a defined distance from the housing.

9. The illumination apparatus of claim 8, wherein the defined distance is between approximately 5 and 50 centimeters.

10. The illumination apparatus of claim 1, wherein angularly distributed light emitted from the light guide substantially overlaps at a defined distance from the housing.

11. The illumination apparatus of claim 10, wherein the defined distance is between approximately 2 and 50 centimeters.

12. The illumination apparatus of claim 1, wherein a diameter of a ring formed by the ring-shaped recess is approximately between 2 and 50 centimeters.

13. The illumination apparatus of claim 12, wherein the diameter of the ring formed by the ring-shaped recess is approximately between 5 and 10 centimeters.

14. The illumination apparatus of claim 1, wherein the set of notches comprise a first set of notches formed on the light guide along a first centerline axis of the light guide, the apparatus further comprising a second set of notches formed on the light guide along a second centerline axis of the light guide.

15. The illumination apparatus of claim 14, wherein the first set of notches are located approximately 5 degrees from points of the light guide in closest proximity to a bottom of the recess in a direction toward a center of the housing.

16. The illumination apparatus of claim 15, wherein the second set of notches are located approximately 30 degrees from points of the light guide in closest proximity to a bottom of the recess in a direction away from a center of the housing.

17. The illumination apparatus of claim 16, wherein notch angles associated with the notches in the first and second sets are approximately 80 degrees.

18. The illumination apparatus of claim 17, wherein the notches in the first and second sets are each separated by approximately 1.5 millimeters.

19. The illumination apparatus of claim 18, wherein notch depths associated with the notches in the first and second sets are approximately 0.3 millimeter.

20. An illumination apparatus comprising:
a housing formed with a recess, wherein the recess defines a ring-like shape and includes one or more interior side walls;
a light guide positioned within the recess such that the light guide is ni proximity to the one or more interior side walls; and
one or more light extraction features in the light guide that define an angular distribution of light emitted from the light guide, wherein the angular distribution of the light emitted from the light guide is such that the light is angularly dispersed from the recess without substantially illuminating the interior side walls, wherein the light extraction features include a first set of notches formed on the light guide along a first centerline axis of the light guide and a second set of notches formed on the light guide along a second centerline axis of the light guide, wherein the first set of notches are located approximately 5 degrees from points of the light guide in closest proximity to a bottom of the recess in a direction toward a center of the housing, wherein the second set of notches are located approximately 30 degrees from points of the light guide in closest proximity to a bottom of the recess in a direction away from a center of the housing, wherein notch angles associated with the notches in the first and second sets are approximately 80 degrees, wherein the notches in the first and second sets are each separated by approximately 1.5 millimeters, wherein notch depths associated with the notches in the first and second sets are approximately 0.3 millimeter, and wherein the notches are arranged such that two notches in the first set separate each notch in the second set.

21. The illumination apparatus of claim 20, wherein the light guide has a diameter of approximately 5 millimeters.

22. A method comprising:
positioning a light guide that transmits light via total internal reflection (TIR) substantially within a recessed housing, wherein the recessed housing defines a ring-like shape and defines one or more interior side walls, and wherein the recessed housing includes a mirror surface on the housing, wherein the mirror surface is substantially surrounded by the ring-like shaped recess; and
emitting light from the light guide via a set of notches formed on the light guide along a centerline axis of the light guide so as to substantially maximize angular distribution of light without substantially illuminating the walls of the recessed housing, wherein an angular distribution of the light defined by the set of notches and emitted from the light guide is such that the light is angularly dispersed from the recess without substantially illuminating the walls of the recessed housing.

23. The method of claim 22, further comprising:
emitting light from the light guide so as to substantially maximize both the angular distribution of light and light intensity without substantially illuminating the walls of the recessed housing.

24. An illumination apparatus comprising:
a housing formed with a recess, wherein the recess defines a ring-like shape and includes one or more interior side walls; and
a mirror surface on the housing, wherein the mirror surface is substantially surrounded by the ring-like shaped recess;
a light guide that transmits light via total internal reflection (TIR) positioned substantially within the recess such that the light guide is in proximity to the one or more interior side walls, wherein the light guide is formed with one or more means for emitting light, wherein the means for emitting light define an angular distribution of light from the light guide, and wherein the angular distribution of light omitted from the light guide is such that light is angularly dispersed from the recess without substantially illuminating the one or more interior side walls, wherein the means for emitting light comprise notches fanned on the light guide along a centerline axis of the light guide.

25. The illumination apparatus of claim 24, wherein the means for emitting light comprise a first set of notches formed on the light guide along a first centerline axis of the light guide and a second set of notches formed on the light guide along a second centerline axis of the light guide wherein angular distribution of the light is defined by the first and second sets of notches.

26. An illumination apparatus comprising:

a housing formed with a recess, wherein the recess includes one or more interior side walls;

a mirrored surface formed on the housing, wherein the recess surrounds the mirrored surface;

a light guide positioned within the recess such that the light guide is in proximity to the one or more interior side walls, wherein the light guide is formed with light extraction features that define an angular distribution of light emitted from the light guide, wherein the light extraction features comprise a set of notches and are arranged such that the angular distribution of the light defined by the light extraction features and emitted from the light guide is such that the light is angularly dispersed from the recess without substantially illuminating the interior side wails, and wherein the light extraction features are arranged such that the angular distribution of the light defined by the light extraction features and emitted from the light guide defines an illumination plane at a defined distance from the housing.

27. The illumination apparatus of claim 26, wherein the defined distance is between approximately 5 and 50 centimeters.

28. The illumination apparatus of claim 26, the defined distance is such that when a user handles the illumination apparatus and views the mirrored surface a face of the user is illuminated at the illumination plane.

29. The illumination apparatus of claim 26, wherein the apparatus comprises a compact.

30. The illumination apparatus of claim 26, wherein greater than approximately 50 percent of light transmitted through the light guide illuminates a target at the illumination plane.

31. The illumination apparatus of claim 26, wherein light guide transmits light via total internal reflection (TIR).

* * * * *

UNITED STATES PATENT AND TRADEMARK OFFICE
CERTIFICATE OF CORRECTION

PATENT NO. : 6,848,822 B2
DATED : February 1, 2005
INVENTOR(S) : Ballen, Todd A.

It is certified that error appears in the above-identified patent and that said Letters Patent is hereby corrected as shown below:

Column 8,
Line 64, delete "tight" and insert -- light --, in place thereof.

Column 9,
Line 15, delete "tight" and insert -- light --, in place thereof.

Column 10,
Line 6, delete "ni" and insert -- in --, in place thereof.

Column 11,
Line 6, delete "omitted" and insert -- emitted --, in place thereof.
Line 12, delete "fanned" and insert -- formed --, in place thereof.

Column 12,
Line 6, delete "wails" and insert -- walls --, in place thereof.
Line 16, after "claim 26", insert -- wherein --.

Signed and Sealed this

Twenty-fourth Day of May, 2005

JON W. DUDAS
*Director of the United States Patent and Trademark Office*